United States Patent [19]

Beall et al.

[11] 3,881,944

[45] May 6, 1975

[54] POROUS GLASS-CERAMIC BODIES FOR CATALYST SUPPORTS

[75] Inventors: George H. Beall; Donald E. Campbell, both of Big Flats; John F. MacDowell, Painted Post; David M. Miller, Elmira; Richard F. Reade, Corning; Hermann L. Rittler, Horseheads; Harry J. Watkins, Ithaca, all of N.Y.

[73] Assignee: Corning Glass Works, Corning, N.Y.

[22] Filed: Dec. 11, 1972

[21] Appl. No.: 313,992

[52] U.S. Cl. ............ 106/39.7; 106/39.6; 106/39.8; 106/40; 65/31; 156/24; 252/477 R
[51] Int. Cl. ......... C03c 3/22; C03c 3/30; C03c 3/04
[58] Field of Search ............. 106/39.6, 39.7, 39.8, 106/40; 65/31; 156/24

[56] References Cited
UNITED STATES PATENTS

| | | | |
|---|---|---|---|
| 2,920,971 | 1/1960 | Stookey | 106/39.8 |
| 3,157,522 | 11/1964 | Stookey | 106/39.8 |
| 3,236,662 | 2/1966 | MacDowell | 106/39.7 |
| 3,582,385 | 6/1971 | Duke et al. | 106/39.7 |
| 3,630,700 | 12/1971 | Hammell | 65/31 |
| 3,647,583 | 3/1972 | DeRouw | 65/31 |
| 3,647,583 | 3/1972 | DeRouw | 65/31 |
| 3,711,263 | 1/1973 | Leger | 65/31 |

*Primary Examiner*—Winston A. Douglas
*Assistant Examiner*—Mark Bell
*Attorney, Agent, or Firm*—Clinton S. Janes, Jr.; Clarence R. Patty, Jr.

[57] ABSTRACT

This invention relates to the development of strong, highly porous glass-ceramic bodies exhibiting extremely high surface areas such as to render them eminently suitable for catalyst supports designed for use in emissions control systems utilized in combination with internal combustion engines. These bodies are manufactured through a leaching process which provides a surface layer or an entire bulk having a relatively homogeneous porosity with very high surface area wherein the size of the pores can be controlled to a reasonable uniformity.

1 Claim, No Drawings

POROUS GLASS-CERAMIC BODIES FOR CATALYST SUPPORTS

In recent years, very intensive research on a large scale has been undertaken to devise various means for purifying the exhaust gases emitted from motor vehicles utilizing internal combustion engines. The device which has been suggested consists of a composite unit comprising a refractory material support to which is applied a film of a compound that will catalyze the oxidation of noxious carbon monoxide and hydrocarbons in the exhaust gases to carbon dioxide and water. Normally, the refractory support or carrier element is chemically inert and catalytically inactive, i.e., it is not affected by and will have no effect upon the exhaust emissions, but it will retain its dimensional integrity up to temperatures as high as 1,400°C. and is sufficiently thermal shock resistant to withstand relatively sharp swings in temperature, e.g., plunging into room temperature water from temperatures up to 900°C. A thin film or coating of catalytically-active material, commonly a metal or a metal oxide, is applied thereon.

Inasmuch as contact between the exhaust gases and the catalyst is required for the oxidation reaction to occur, the greater the surface area of catalyst exposed to the gases the greater will be the efficiency of the unit. Therefore, the refractory support materials have generally exhibited some porosity with these pores being impregnated with the coating of catalyst material. In general, the support elements have been formed through the sintering of such materials as sillimanite, petalite, alumina, cordierite, mullite, spodumene, zircon, and other materials having low coefficients of thermal expansion and relatively high refractoriness. Such bodies have exhibited surface areas on the order of 0.2–2 square meters/gram of material with at least 95 percent of the pore volume thereof being in pores having a diameter greater than 0.1 micrometer (micron) and at least 5 percent of the pore volume being in pores having a diameter greater than 40 micrometers (microns).

Although the catalyst support can be in the form of beads or pellets, a preferred structure consists of a unitary skeletal body having a plurality of unobstructed channels passing therethrough in the direction of exhaust gas flow. Normally, this monolithic unit is of a shape to fit the reaction zone into which it is to be positioned. The channels through the unit are of any configuration and dimensions which achieve the desired surface area exposure consistent with free passage of the exhaust gases and freedom from plugging by particulate material that may be present in the gases, e.g., lead compounds. In a preferred configuration, the openings are parallel and extend through the unit from one side to the opposite side, these channels being separated from one another by very thin walls.

It has been found that not only is total surface area of the support important in assuring efficient catalyst operation but the size of the pores and the uniform control of this pore size is vital to obtain the highest efficiency. Hence, it has been demonstrated that the pores may be of such small diameter that the catalyst film will not completely penetrate therein to coat the walls so as to be available for contact with the exhaust gases. Also, the exhaust gases may not fairly enter into the small pores to react with the catalyst present therein. Likewise, pores of large size reduce the surface area potential for exhaust gas control. Thus, there has been a need for catalyst supports of high refractoriness and excellent resistance to thermal shock having a uniformly porous structure, at least within the surface thereof, wherein the pore size is carefully controlled.

Therefore, the primary objective of the instant invention is to provide a refractory support upon which a catalyst is deposited, which support is, itself, relatively catalytically inert and catalytically inactive but wherein at least a surface portion thereof has a uniform porosity; the size of these pores being carefully controlled within a critical range such that the catalyst can be utilized to the highest efficiency.

This objective can be achieved through the use of glass-ceramic bodies of carefully specified compositions for the refractory support material wherein the desired uniform high porosity and carefully controlled pore size is obtained through a leaching procedure.

A glass-ceramic article is produced through the crystallization in situ of a glass article via a heat treating technique. Thus, a glass-forming batch, to which a nucleating agent is commonly admixed, is melted, the melt cooled to a glass, and an article of a desired configuration shaped therefrom. This glass shape is then first heated to a temperature within or somewhat above the transformation range thereof to cause the development of nuclei within the glass body which act as sites for the growth of crystals thereon as the heat treatment is continued, normally at a higher temperature but below the deformation temperature of the article. The transformation range of a glass is that temperature at which a melt is deemed to have been converted into an amorphous solid, this temperature generally being defined as lying within the vicinity of the strain point and annealing point of a glass.

Inasmuch as the glass-ceramic article is the result of essentially simultaneous growth of crystals upon a myriad of nuclei uniformly distributed through a glassy matrix, the final article consists of relatively uniformly-sized, very fine-grained crystals homogeneously dispersed throughout a residual glassy matrix. A glass-ceramic article commonly is more crystalline than glass so that the article takes on properties more closely akin to those of the crystal than those of the original glass. Furthermore, the residual glassy matrix has a far different composition from that of the parent glass since the crystal components will have been precipitated therefrom. A glass-ceramic article is free from voids and non-porous. U.S. Pat. No. 2,920,971, the basic patent in the field of glass-ceramics, sets forth the theoretical considerations and practical aspects in the production of such articles and reference is made thereto for further information concerning the manufacture and characteristics thereof.

In its broadest terms, the instant invention involves the production of glass-ceramic articles demonstrating very high refractoriness, i.e., having a use temperature of at least 1,200°C., and preferably, up to 1,400°C., and a low coefficient of thermal expansion, i.e., less than 40 × 10$^{-7}$/°C. over the temperature range of 25°–900°C., which, when subjected to after-defined leaching treatments, will exhibit at least a surface layer manifesting a high and relatively uniform porosity with the vast majority of the pores having diameters ranging between about 0.1–40 micrometers to provide a surface area of about 1–100 meters$^2$/gram. Four areas within four composition fields have been found amenable to specific leaching parameters to yield bodies having the above-described porosity character. Thus, glass-ceramic bodies wherein a principal crystal phase is mullite, celsian, beta-spodumene, or cordierite can, in certain compositional areas, be leached to yield the above-described products. Hence, although each is susceptible to the broad concept of leaching, the parameters of the leaching technique are somewhat different for each material and the chemical composition must be held within strictly-controlled limits to obtain the desired uniform porosity.

Glass-ceramic articles wherein celsian and/or cordierite comprises a principal crystal phase can be produced through the crystallization in situ of glass articles consisting essentially, by weight on the oxide basis, of about 2.5–5% $Li_2O$, 2.5–8% RO, wherein RO consists of BaO and/or MgO, 14–22% $Al_2O_3$, 60–75% $SiO_2$, and 3–8% $RO_2$ as a nucleating agent, wherein $RO_2$ consists of 3–8% $TiO_2$ and 0–3% $ZrO_2$. When heat treated within the temperature range of about 900°–1200°C., celsian ($BaO.Al_2O_3.2SiO_2$) and/or cordierite ($2MgO.2Al_2O_3.5SiO_2$) and beta-spodumene solid solution (classical formula $Li_2O.Al_2O_3.4SiO_2$) constitute the primary crystal phases developed in situ. The crystallized bodies have service temperatures approaching 1300°C. and exhibit coefficients of thermal expansion (25°–900°C.) of less than $20 \times 10^{-7}/°C$. U.S. Pat. No. 3,582,385 is directed toward a group of celsian-containing glass-ceramic articles which are especially suitable for the leaching process of the present invention.

Hot dilute aqueous solutions of mineral acids such as HCl, $HNO_3$, $H_2SO_4$, $H_3PO_4$, etc., act to preferentially leach the celsian and cordierite crystals to yield porous bodies of high surface area but with extremely fine pores. Dilute aqueous solutions at room temperature (R.T.) of NaOH, HF, or $NH_4F.HF$ preferentially leach the beta-spodumene solid solution crystals to produce bodies with larger pores but also with much lower surface areas. These phenomena are illustrated in Table I wherein are listed various leaching treatments applied to honeycomb structures of Example 7 of U.S. Pat. No. 3,582,385, which had been crystallized in situ by heat treatment for two hours at 800°C. followed by two hours at 1,090°C. The glass composition, in weight percent on the oxide basis, of that example is tabulated immediately below:

| | |
|---|---|
| $SiO_2$ | 69.7% |
| $Al_2O_3$ | 17.8 |
| $Li_2O$ | 4.3 |
| BaO | 3.1 |
| $TiO_2$ | 4.3 |
| $As_2O_3$ | 0.8 |

TABLE I

| Treatment | Average Pore Diameter Micrometers | Surface Area Meters²/gram |
|---|---|---|
| None | — | Nil |
| 1N HCl, 2 hours at 95°C. | <0.012 | 24.6 |
| 1N HCl, 6 hours at 95°C. | <0.012 | 30.9 |
| 1N $HNO_3$, 2 hours at 95°C. | <0.012 | 19.1 |
| 1N $HNO_3$, 6 hours at 95°C. | <0.012 | 30.5 |
| 5N HCl, 1 hour at 95°C. | <0.012 | 17.6 |
| 5N $HNO_3$, 1 hour at 95°C. | <0.012 | 17.6 |
| 1N NaOH, 4 hours at 95°C. | 0.35 | <1.0 |
| 5N, HF, 10 minutes at R.T. | 0.35 | 2.7 |

However, a combination of these two types of leaching techniques will produce porosity with larger pores and large surface area. In broad outline, the body is first subjected to an acid leach to develop the fine pores followed by a short leach with HF, $NH_4F.HF$, or NaOH to enlarge the pores. The resultant porosity is especially suitable for catalyst support materials. Table II clearly illustrates that HF is the preferred second leachant. NaOH is the least desirable in that, while securing larger pores, it substantially decreases the surface area as is illustrated in the first example recorded in Table II. The second treatment recorded, viz., a one-hour leach with 5N HCl at 95°C. following with a three-minute leach in 5N HF at room temperature (R.T.), appears to provide the optimum configuration of porosity and surface area.

TABLE II

| Treatment | Average Pore Diameter Micrometers | Surface Area Meters²/gram |
|---|---|---|
| 5N HCl, 1 hour at 95°C. + 5N NaOH, 10 minutes, 95°C. | 0.09 | <1.0 |
| 5N HCl, 1 hour at 95°C. + 5N HF, 3 minutes at R.T. | 0.25 | 9.3 |
| 5N $HNO_3$, 1 hour at 95°C. + 5N HF, 3 minutes at R.T. | 0.20 | 9.6 |
| 5N HCl, ½ hour at 95°C. + 5N HF, 3 minutes at R.T. | 0.20 | 5.1 |
| 5N HCl, 1 hour at 95°C. + 5N $NH_4F.HF$, ½ hour at R.T. | 0.15 | 9.7 |
| 5N $HNO_3$, 1 hour at 95°C. + 5N $NH_4F.HF$, ½ hour at R.T. | 0.12 | 7.0 |

A further advantageous feature resulting from the leaching step is an improvement in the thermal shock resistance of the final porous body. In general, the coefficient of thermal expansion exhibited by the crystallized product after leaching is below $10 \times 10^{-7}/°C$.

Glass-ceramic articles wherein the crystal phase consists predominantly or solely of beta-spodumene solid solution crystals are well known in the art. U.S. Pat. No. 2,920,971 reports examples of such and U.S. Pat. No. 3,157,522 is specifically directed to such articles which are crystallized from glasses consisting essentially, by weight on the oxide basis of about 55–75% $SiO_2$, 2–15% $Li_2O$, 12–36% $Al_2O_3$, and 3–7% $TiO_2$. When exposed to temperatures between about 900°–1,200°C., the glasses crystallize in situ to glass-ceramic articles wherein beta-spodumene solid solution forms the predominant or sole crystal phase. These articles have use temperatures up to 1,200°C. and exhibit a coefficient of thermal expansion less than $15 \times 10^{-7}/°C$.

Where minor amounts, i.e., less than about 7 percent by weight, of $B_2O_3$ and/or $P_2O_5$ are included in the glass composition, the residual glassy matrix can be readily preferentially removed from the body. With $B_2O_3$ and/or $P_2O_5$ contents greater than about 7 percent, the overall refractoriness of the body is deleteriously affected.

In general, the leaching procedure will be multistep. Normally, the glass-ceramic article will be exposed first to dilute aqueous HF and thereafter to one or more dilute or concentrated mineral acid or base aqueous solutions. A heat treatment of the leached structure at temperatures of at least 1,000°C. may also be useful in varying the porosity, pore diameter, and surface area of the body. Thus, post leach heat treatments of 16 hours at 1,000°C. (and shorter exposures at higher temperatures) begin to manifest noticeable increases in porosity of the leached body with a concomitant decrease in surface area. Changes in the crystalline phase may also be observed. For example, rutile ($TiO_2$) crystals may develop at temperatures of 1,100°C. and higher and the beta-spodumene may begin to be transformed to mullite ($3Al_2O_3 \cdot 2SiO_2$). Frequently, the coefficient of thermal expansion of the leached body is less than that of the pristine glass-ceramic. This phenomenon is believed due to the removal of the residual glassy phase. The completely leached body can be heated to 1,400°C. without cracking or deformation.

Table III reports various combinations of leaching techniques and post leach heat treatments applied to 0.070 I.D. × 0.012 inch O.D. tubing samples of the following glass composition which had been crystallized in situ by heating to 800°C. for two hours followed by four hours at 1,050°C. The glass composition is tabulated below in weight percent on the oxide basis.

| | |
|---|---|
| $SiO_2$ | 64.5% |
| $Al_2O_3$ | 18.9 |
| $Li_2O$ | 3.7 |
| $ZnO$ | 2.5 |
| $TiO_2$ | 4.4 |
| $As_2O_3$ | 0.8 |
| $B_2O_3$ | 5.0 |
| F | 0.2 |

The leach and post leach treatments reported in Table III clearly illustrate an ability to control the development of porosity and concomitant surface area over a wide range. This capability has been put to good use in the development of catalyst support members. Thus, monoliths of these materials have been successfully coated with noble metal and base metal catalysts to yield a product eminently suitable for automobile emissions control devices.

Table IV records other $B_2O_3$ and/or $P_2O_5$-containing glass-ceramic compositions, in weight percent on the oxide basis, which have been subjected to the leaching and post leach treatments listed in Table V to provide bodies of the desired pore size and surface area.

TABLE IV

| | 1 | 2 | 3 | 4 | 5 | 6 | 7 | 8 |
|---|---|---|---|---|---|---|---|---|
| $SiO_2$ | 68.5% | 62.3% | 62.3% | 67.6% | 64.9% | 60.9% | 68.3% | 69.9% |
| $Al_2O_3$ | 18.2 | 16.4 | 16.4 | 14.4 | 22.2 | 22.2 | 16.5 | 16.4 |
| $Li_2O$ | 4.0 | 4.0 | 4.0 | 3.8 | 3.7 | 3.7 | 4.0 | 3.8 |
| $ZnO$ | 1.2 | 2.0 | 2.0 | 1.0 | 2.8 | 2.8 | 1.1 | 1.0 |
| $TiO_2$ | 4.6 | 4.3 | 4.3 | 4.4 | 4.6 | 4.6 | 4.5 | 4.4 |
| $As_2O_3$ | 1.0 | — | — | 0.6 | 0.6 | 0.6 | 0.6 | — |
| $B_2O_3$ | 2.5 | 6.0 | — | 4.5 | 1.0 | 5.0 | 5.0 | 2.0 |
| $P_2O_5$ | — | — | 6.0 | — | — | — | — | 2.0 |
| $ZrO_2$ | — | 1.0 | 1.0 | — | — | — | — | — |
| F | — | 4.0 | 4.0 | — | 0.2 | 0.2 | — | — |
| $Cs_2O$ | — | — | — | 3.6 | — | — | — | — |
| CaO | — | — | — | — | — | — | — | 0.5 |

The various leaching and post leach treatments set out in Table V were conducted at room temperature on the compositions listed in Table IV wherein the glasses were crystallized in situ by heating to 800°C. for 2 hours followed by two hours at 1,050°C.

TABLE V

| Example No. | Leaching Treatment | Post Leach Heat Treatment |
|---|---|---|
| 1, 2, 6, 7, and 8 | 2.5% HF, 3 minutes<br>6N HCl, 1 hour<br>2N NaOH, 1 hour<br>2N $HNO_3$, 1 hour | None |
| 1 and 7 | 10% HF, 5 minutes<br>5N NaOH, 3 hours<br>6N HCl, 6 hours<br>3N $HNO_3$, 6 hours | 1000°C., 16 hours |
| 3, 4, and 5 | 10% HF, 10 minutes<br>2N NaOH, 24 hours<br>2N $HNO_3$, 6 hours<br>6N HCl, 24 hours | 1400°C., 16 hours |

TABLE III

| Leach Treatment | Post Leach Heat Treatment | Average Pore Diameter Micrometers | Surface Area Meters²/Gram |
|---|---|---|---|
| 10% HF, 20 minutes at R.T. | None | 0.4 | 1 |
| 6N HCl + 6N $B_2O_3$, 16 hours at R.T. | | | |
| do. | 600°C., 16 hours | 0.4 | 1.6 |
| do. | 800°C., 16 hours | 0.6 | 1 |
| do. | 1000°C., 16 hours | 0.7 | 4.2 |
| do. | 1100°C., 16 hours | 0.6 | 1.9 |
| 10% HF, 20 minutes at R.T.<br>2N $HNO_3$, 16 hours at R.T.<br>6N HCl + 6N $B_2O_3$, 16 hours at R.T.<br>2N $HNO_3$, 16 hours at R.T. | None | 0.3 | 21 |
| do. | 600°C., 16 hours | 0.3 | 23 |
| do. | 800°C., 16 hours | 0.3 | 20 |
| do. | 1000°C., 16 hours | 0.3 | 6.7 |
| do. | 1100°C., 16 hours | 0.3 | 1.7 |
| 10% HF, 20 minutes at R.T.<br>2N NaOH, 16 hours at R.T.<br>2N $HNO_3$, 16 hours at R.T. | None | 0.2 | 81 |
| do. | 600°C., 16 hours | 0.2 | 67 |
| do. | 800°C., 16 hours | 0.3 | 54 |
| do. | 1000°C., 16 hours | 0.4 | 4 |
| do. | 1100°C., 16 hours | 0.2 | <1 |

In certain base glass compositions containing about 2–6% MgO with about 4–7% $B_2O_3$ and/or $P_2O_5$, the crystallization in situ step results in a residual glassy matrix comprised of two amorphous phases, viz., a siliceous phase and a $B_2O_3$ and/or $P_2O_5$-containing phase. In such situations, the nonsiliceous phase is frequently much less chemically durable and, in some cases, can be dissolved in hot water. An example of such a composition is recited below:

| | |
|---|---|
| $SiO_2$ | 62.9% |
| $Al_2O_3$ | 19.7 |
| $B_2O_3$ | 5.7 |
| $Li_2O$ | 3.0 |
| $Na_2O$ | 0.5 |
| $K_2O$ | 0.1 |
| MgO | 3.5 |
| $TiO_2$ | 3.6 |
| $ZrO_2$ | 0.6 |
| $As_2O_3$ | 0.3 |
| CaO | 0.1 |

After crystallizing the glass in situ through heating at 800°C. for 2 hours followed by heating at 1,100°C. for four hours, the body was crushed to pass a 325 Tyler mesh screen (44 micrometers). After contact with boiling water for several hours, about 17 percent by weight of the powdered crystallized body was extracted, an analysis of this extract indicating a $B_2O_3$-rich, borosilicate material. Subsequent treatment of the powdered sample with boiling aqueous 0.0057% EDTA (free acid) removed an additional about 4% by weight of the glass-ceramic which was analyzed as a highly siliceous material. X-ray diffraction examination of the leached powder showed little, if any, effect upon the beta-spodumene structure of the crystals as a result of the treatment. Such compositions enable products of the desired porosity and pore size to be secured very economically through leaching. However, the chemical durability of the base articles is obviously not high and this factor may restrict the service applications to which such articles can be utilized.

Glass-ceramic articles wherein the crystal phase consists predominantly or solely of cordierite ($2MgO.2Al_2O_3.5SiO_2$) are well-recognized in the art. Hence, for example, U.S. Pat. No. 2,920,971, referred to above as the basic patent in the field of glass-ceramics, tabulates at least 17 working examples containing cordierite as a principal phase. These compositions vary within the range of about 4–23% MgO, 9–31% $Al_2O_3$, and 44–68% $SiO_2$ with about 7–13% $TiO_2$ as a nucleating agent. However, certain glasses within a narrower region of MgO-$Al_2O_3$-$SiO_2$ compositions, exhibit a unique character when crystallized in situ.

Thus, glass articles consisting essentially, by weight on the oxide basis, of about 10–21% MgO, 24–38% $Al_2O_3$, and 48–60% $SiO_2$, when nucleated with about 8–12% $TiO_2$, initially form nuclei of magnesium dititanate ($MgO.2TiO_2$). Beta-quartz solid solution crystals first form on these nuclei but, as the crystallization heat treatment continues and the temperature is raised, this beta-quartz solid solution phase gradually changes to approximate an alpha-quartz solid solution phase with accompanying spinel ($MgO.Al_2O_3$) and sapphirine ($4MgO.5Al_2O_3.2SiO_2$) crystals. At still higher crystallization temperatures, the quartz and spinel appear to react to form cordierite and crystals of rutile ($TiO_2$) may appear.

When the crystallization process is carried out only to the point where alpha-quartz is still the principal crystal phase, but where an appreciable amount of the cordierite phase has developed, a crystalline morphology is present within the article which is especially suitable for selective leaching. Hence, the cordierite crystals can be leached out of the body with HF much more rapidly than can the alpha-quartz and spinel. Thus, after leaching, the morphology consists of alpha-quartz, spinel, and pores, the depth to which this morphology extends being dependent upon the leaching techniques employed. The porous article can thereafter be subjected to the high temperature crystallization treatment to secure the desired cordierite and, optionally, rutile phases and thereby produce products capable of use temperatures of 1,200°C. and higher with coefficients of thermal expansion of 30 × $10^{-7}$/°C. and lower. This partial crystallization technique followed by leaching is particularly suitable for securing uniformly porous, strong bodies exhibiting low coefficients of thermal expansion.

Table VI records a group of glass compositions, in weight percent on the oxide basis, which fall within the parameters specified above and, therefore, display the unique crystallization behavior also described above.

TABLE VI

| | 1 | 2 | 3 | 4 |
|---|---|---|---|---|
| $SiO_2$ | 52.3% | 47.0% | 45.1% | 46.6% |
| $Al_2O_3$ | 23.5 | 26.2 | 33.3 | 28.2 |
| MgO | 14.4 | 17.0 | 11.8 | 13.4 |
| $TiO_2$ | 8.9 | 8.9 | 8.9 | 11.4 |
| $As_2O_3$ | 0.9 | 0.9 | 0.9 | 0.4 |

Table VII reports various leaching techniques conducted at room temperature which were applied to 0.030–0.060 inch thick ribbon samples of each of the four examples recited in Table VI that had been heat treated for 2 hours at 800°C. followed by 1 hour at 1,050°C. to transform the glasses to glass-ceramic articles, wherein alpha-quartz solid solution constituted the predominant crystal phase but also containing up to about 20 percent cordierite crystals. Also recited are the average resultant pore diameters and total porosities measured on each example after samples had been subsequently fired at 1,200°C. for two hours to cause the conversion of the alpha-quartz solid solution crystals to cordierite.

TABLE VII

| Acid Treatment | Average Pore Size Distribution | Total Porosity |
|---|---|---|
| 20% HF, 1 hour | Overall between 0.2–20 micrometers<br>Majority between 10–20 micrometers | 12.6% |
| 3N HF, 2 hours<br>1.5N $HNO_3$, ¼ hour<br>1/8N HF, 1 hour<br>1.5N $HNO_3$, ¼ hour | Overall between 0.2–20 micrometers<br>Majority between 10–20 micrometers | 12.7% |
| 3N HF, 2 hours<br>1.5N $HNO_3$, ¼ hour<br>1/8N HF, 1 hour<br>1.5N $HNO_3$, ¼ hour<br>1/8N HF, 1 hour<br>1.5N $HNO_3$, ¼ hour | Overall between 0.2–20 micrometers<br>Majority between 10–20 micrometers | 14.1% |

Glass-ceramic bodies wherein mullite ($3Al_2O_3\cdot2SiO_2$) constitutes the predominant crystal phase, such as are disclosed in U.S. Pat. No. 3,236,662, have also been found amenable to the leaching practice of this invention. Such bodies can be produced by heat treating glass articles consisting essentially, by weight, of about 35–70% $Al_2O_3$, 10–64% $SiO_2$, at least one modifying oxide in the indicated proportion selected from the group consisting of 1–20% $P_2O_5$, 1–5% $Li_2O$, 4–10% $Na_2O$, 1–15% $K_2O$, 4–25% $Rb_2O$, 4–15% $Cs_2O$, 4–10% CaO, 4–10% SrO, 4–40% BaO, and 4–20% $La_2O_3$, the total of these modifying oxides not exceeding 40 percent, and up to 40 percent total of refractory oxides in the indicated proportion selected from the group consisting of 0–25% $ZrO_2$, 0–30% $ThO_2$, 0–20% MgO, and 0–10% BeO. These glasses can be crystallized in situ by heating to temperatures within the range 1,000°–1,500°C.

Depending upon the parent glass composition, the final product will demonstrate crystallinity varying from as little as 25 percent by weight up to an essentially totally crystalline article. At the higher crystal contents, the glass-ceramic bodies are very refractory, i.e., use temperatures of up to 1,500°C. can be enjoyed, with coefficients of thermal expansion ranging between about 30–35 × $10^{-7}$/°C. The internal microstructure is very uniform, comprising a two-phase assemblage of mullite (with, perhaps, a minor amount of other crystals, e.g., $ZrO_2$) and highly siliceous glass. This glass can be preferentially leached in dilute aqueous hydrofluoric acid solutions in accordance with the following description to produce at least a surface layer on the glass-ceramic body exhibiting a microporous crystalline structure.

Thus, dilute aqueous solutions of HF at room temperature preferentially leach the highly siliceous, residual glass to yield porous bodies of very high surface area and with very fine pores. The temperature of the leaching solution can be raised to expedite the removal of the glass phase. However, the pore size can become so extremely fine that the utility of the porous structure as a catalyst support may be impaired.

Although these mullite-containing glass-ceramic articles may be no more than about 25 percent crystalline, the article after leaching will retain its original physical dimensions and exhibit good mechanical strength as a result of the interlocking of the tabular or acicular mullite crystals. Hence, a supporting internal structure is provided through the morphology of the mullite crystals which acts to prevent deformation or even possible collapse of the body during leaching of the highly siliceous glass phase.

Table VIII reports the results of leaching three –100 mesh powder samples of the following glass compositions which, as one-fourth inch square rods, had been crystallized in situ in accordance with three different heat treating schedules:

| | |
|---|---|
| $SiO_2$ | 52% |
| $Al_2O_3$ | 38 |
| BaO | 10 |

In sample 1, the rod was heated at 300°C./hour from room temperature to 920°C., held at that temperature for 2 hours, heated at 300°C./hour to 1,410°C., held at that temperature for 10 hours, and thereafter removed from the heat treating chamber into the ambient atmosphere.

In sample 2, the rod was heated at 300°C./hour from room temperature to 1,510°C., held at that temperature for 10 hours, and then removed from the heat treating chamber into the ambient atmosphere.

In sample 3, the rod was heated at 300°C./hour from room temperature to 920°C., held at that temperature for 2 hours, heated at 300°C./hour to 1,305°C., held at that temperature for 10 hours, and thereafter removed from the heat treating chamber into the ambient atmosphere.

In each instance, the –100 mesh powder was placed in an aqueous solution of 10 percent HF at room temperature and retained therein for 21 hours. The powder was then dried at 110°C. for 2 hours. Each powder sample was weighed before leaching and then after being dried with the weight change being noted. Also, a sample of each powder was measured for porosity, pore distrubtion, and surface area before and after leaching.

TABLE VIII

| | |
|---|---|
| Sample 1 | |
| Initial Weight | 15.7895 grams |
| Final Weight | 13.8553 |
| Weight Loss | 1.9342 grams |
| Porosity before leaching | 44.7% |
| Porosity after leaching | 56.5% |
| Surface area before leaching | <1 meter²/gram |
| Surface area after leaching | 3.1 meter²/gram |
| Percent new porosity produced by leaching | 21% |
| Average pore size | 0.15 micrometer |
| Sample 2 | |
| Initial Weight | 16.2053 grams |
| Final Weight | 14.0523 |
| Weight Loss | 2.1530 grams |
| Porosity before leaching | 44.8% |
| Porosity after leaching | 55.7% |
| Surface area before leaching | <1 meter²/gram |
| Surface area after leaching | 1.6 meter²/gram |
| Percent new porosity produced by leaching | 20% |
| Average pore size | 0.5 micrometer |
| Sample 3 | |
| Initial Weight | 12.3089 grams |
| Final Weight | 10.5677 |
| Weight Loss | 1.7412 grams |
| Porosity before leaching | 37.1% |
| Porosity after leaching | 42.5% |
| Surface area before leaching | <1 meter²/gram |
| Surface area after leaching | 4.5 meter²/gram |
| Percent new porosity produced by leaching | 9% |
| Average pore size | 0.1 micrometer |

Table VIII illustrates the effect which the crystallization heat treatment has upon porosity developed through leaching and the resulting pore size. Hence, samples 1 and 2 were crystallized at higher temperatures than was sample 3 leading to the development of more extensive crystallization therein. That phenomenon resulted in the residual glassy matrix being more highly siliceous and, thus, more readily leached by the HF. Greater additional porosity was obtained through the leaching process and the pores were larger than in the lower temperature crystallization treatment.

We claim:

1. A glass-ceramic article having a use temperature of at least 1,200°C., a coefficient of thermal expansion (25°–900°C.) less than 40 × $10^{-7}$/°C., and at least a surface portion of relatively uniform porosity with pore diameters ranging between about 0.1–40 micrometers to provide a surface area of about 1–100 meters²/gram, said glass-ceramic being selected from the group:

a. consisting essentially, by weight on the oxide basis, of 2.5–5% $Li_2O$, 2.5–8% BaO and/or MgO, 14–22% $Al_2O_3$, 60–75% $SiO_2$, and 3–8% $RO_2$, wherein $RO_2$ consists of 3–8% $TiO_2$ and 0–3% $ZrO_2$, and wherein the principal crystal phase is celsian and/or cordierite;

b. consisting essentially, by weight on the oxide basis, of 2–15% $Li_2O$, 12–36% $Al_2O_3$, 55–75% $SiO_2$, and 3–7% $TiO_2$, and wherein the principal crystal phase is beta-spodumene;

c. consisting essentially, by weight on the oxide basis, of 10–21% MgO, 24–38% $Al_2O_3$, 48–60% $SiO_2$, and 8–12% $TiO_2$, and wherein the principal crystal phase is cordierite; and d. consisting essentially, by weight on the oxide basis, of 35–70% $Al_2O_3$, 10–64% $SiO_2$, at least one modifying oxide in the indicated proportion selected from the group consisting of 1–20% $P_2O_5$, 1–5% $Li_2O$, 4–10% $Na_2O$, 1–15% $K_2O$, 4–25% $Rb_2O$, 4–15% $Cs_2O$, 4–10% CaO, 4–10% SrO, 4–40% BaO, and 4–20% $La_2O_3$, the total of said modifying oxides not exceeding 40%, and up to 40% total of refractory oxides in the indicated proportions selected from the group consisting of 0–25% $ZrO_2$, 0–30% $ThO_2$, 0–20% MgO, and 0–10% BeO, and wherein the principal crystal phase is mullite.

* * * * *